US008115438B2

(12) United States Patent
Gunton

(10) Patent No.: US 8,115,438 B2
(45) Date of Patent: Feb. 14, 2012

(54) APERTURE CLOSURE MEMBER CONTROL ARRANGEMENTS

(76) Inventor: Bruce Stanley Gunton, Yoxall (GB)

( * ) Notice: Subject to any disclaimer, the term of this patent is extended or adjusted under 35 U.S.C. 154(b) by 496 days.

(21) Appl. No.: 12/299,660

(22) PCT Filed: May 3, 2007

(86) PCT No.: PCT/GB2007/001641

§ 371 (c)(1),
(2), (4) Date: Jan. 26, 2009

(87) PCT Pub. No.: WO2007/129063

PCT Pub. Date: Nov. 15, 2007

(65) Prior Publication Data

US 2009/0195208 A1 Aug. 6, 2009

(30) Foreign Application Priority Data

May 6, 2006 (GB) .................................. 0608973.4

(51) Int. Cl.
*G05D 3/18* (2006.01)
*H02P 1/04* (2006.01)
*H02P 3/02* (2006.01)

(52) U.S. Cl. ........ 318/466; 318/264; 318/265; 318/268; 318/275; 318/277

(58) Field of Classification Search .................. 318/256, 318/264–268, 275, 277, 280, 286, 466
See application file for complete search history.

(56) References Cited

U.S. PATENT DOCUMENTS 4,181,884 A * 1/1980 Shirasaki et al. ........ 324/207.25
4,553,426 A * 11/1985 Capurka .................... 73/114.26
4,952,080 A 8/1990 Boiucaner et al.
5,545,961 A 8/1996 Peter et al.
6,624,603 B2 * 9/2003 Preymann ..................... 318/281

FOREIGN PATENT DOCUMENTS

DE 4337828 5/1995
DE 199918414 11/2000
DE 102005039532 3/2007
EP 1046775 A2 10/2000
WO 2007001493 A2 1/2007

* cited by examiner

*Primary Examiner* — Derek Rosenau
(74) *Attorney, Agent, or Firm* — Chernoff, Vilhauer, McClung & Stenzel

(57) ABSTRACT

An aperture closure member control arrangement includes a disc which rotates as the aperture closure member moves. The disc has a ring of teeth. A sensor, such as a Hall effect sensor and permanent magnet, detect the passage of teeth as a cyclic waveform of amplitude and frequency determined by the spacing of the teeth, and the speed of rotation of the disc. An irregularity in the form of a missing tooth creates an irregularity in the output of the sensor, in the form of a pulse of greater amplitude and lower frequency. Accordingly, pulses from the irregularity can be discriminated and counted to provide a coarse indication of position, or pulses from the teeth can be counted, to provide a fine indication.

52 Claims, 6 Drawing Sheets

APERTURE CLOSURE MEMBER CONTROL ARRANGEMENTS

This is a national stage application filed under 35 USC 371 based on International Application No. PCT/GB2007/001641 filed May 3, 2007, and claims priority under 35 USC 119 of United Kingdom Patent Application No. 0608973.4 filed May 6, 2006.

The present invention relates to control arrangements for aperture closure members.

Motorised aperture closure members are used for a variety of purposes, such as for domestic garage doors, factory and warehouse doors and the like. Types of aperture closure member include flexible members made of reinforced fabric or sheet metal, or sectional closures made of separate sections which are articulated to each other. These closure members can be moved along curved tracks or rolled around rollers or drums in order to open and close the corresponding aperture. Typically, the closure member moves vertically, either rolling on and off a roll above the aperture, or onto and off a track extending inwardly from the top of the aperture.

An electric motor is commonly used for driving the movement of the aperture closure member. It is desirable to monitor the movement, for various reasons. For example, it may be desirable to slow down the member, when approaching the extremes of its movement, and to sense and respond to any resistance to movement which may arise as the result of a fault, or because the closure member encounters a foreign body blocking the aperture.

Embodiments of the present invention provide an aperture closure member control arrangement, comprising:

a pulse generator operable to create a train of pulses as the aperture closure member moves;

a counter operable to count pulses of the train to provide an indication of the position of the aperture closure member;

wherein the pulse generator creates first type pulses and less frequent second type pulses, and wherein the arrangement further includes a discriminator operable to discriminate between first and second type pulses, for selectively providing first or second type pulses to a counter for counting.

The discriminator may monitor the size, amplitude and/or pulse width of pulses received, the first and second type pulses being distinguishable by the monitored parameter or parameters. The selection of pulses made by the discriminator for provision to the counter may be dependent on the count value at the time. One type of pulse may be counted until a threshold count is reached, the other type of pulse being counted thereafter. The second type pulses may be counted until the threshold is reached.

The pulses may be created by a member which rotates as the aperture closure member moves. The rotatable member may have a ring of features, there being a sensor operable to sense the passing of the features as the member rotates, to create pulses for counting. The features may be teeth formed around the rotatable member. The passage of features may create first type pulses. Features may be provided at regular intervals around the ring, there being at least one position around the ring at which the regularity is disturbed, to form an irregularity which creates second type pulses. A feature may be omitted from a regular position, to create the irregularity. Alternatively, a feature may be irregularly large to create the irregularity.

If the features are teeth, the irregularity may be formed by omitting a tooth or by creating a tooth of abnormal size.

The sensor may include a magnet and a Hall effect sensor, both in proximity with the rotatable member to sense changes in magnetic field as the features pass the sensor.

In another aspect, embodiments of the invention provide an aperture closure member control arrangement comprising:

a rotatable member which rotates as the aperture closure member moves;

a sensor;

a ring of features on the rotatable member and able to be sensed by passing the sensor to create a train of first type pulses;

wherein the ring of features includes an irregularity at least one position, to create a second type pulse within the train.

The first and second type pulses may be distinguishable by size, amplitude and/or pulse width. The features may be discernible optically, magnetically or mechanically. The features may be teeth.

The features may be of magnetic material, there being an associated magnet arranged so that the passing of features creates a detectable change in the magnetic field in the vicinity of the magnet. The sensor may include a magnetic sensor operable to sense magnetic changes as the features pass.

The features may be teeth formed around the rotatable member. The passage of features may create first type pulses. Features may be provided at regular intervals around the ring, there being at least one position around the ring at which the regularity is disturbed, to form an irregularity which creates second type pulses. A feature may be omitted from a regular position, to create the irregularity. Alternatively, a feature may be irregularly large to create the irregularity.

If the features are teeth, the irregularity may be formed by omitting a tooth or by creating a tooth of abnormal size.

The sensor may include a magnet and a Hall effect sensor, both in proximity with the rotatable member to sense changes in magnetic field as the features pass the sensor.

In a further aspect, embodiments of the invention provide an aperture closure member control arrangement comprising:

a control circuit operable to provide electrical power to a motor to drive the aperture closure member, when required;

a current supply powered from the motor supply to return a signal current to the control circuit;

and a sensor operable to modulate the signal current in accordance with movement of the aperture closure member, for sensing at the control circuit.

The current supply may be powered by a first polarity of the motor supply, the signal current being connected to another polarity of the motor supply, at the control circuit. The signal current may be carried by a single conductor from the sensor to the control circuit.

The current supply may include a Darlington pair of transistors, having a base to which the output of the sensor is applied, to modulate the current supplied.

The control circuit may be located remotely of the motor, for manual access to the control circuit without proximity to the motor.

The sensor may sense movement of a rotatable member which rotates as the aperture closure member moves. The rotatable member may have a ring of features able to be sensed by passing the sensor to create a train of pulses. The ring of features may create a train of first type pulses, the ring of features also including an irregularity at least one position, to create a second type pulse within the train.

The first and second type pulses may be distinguishable by size, amplitude and/or pulse width. The features may be discernible optically, magnetically or mechanically. The features may be teeth.

The features may be of magnetic material, there being an associated magnet arranged so that the passing of features creates a detectable change in the magnetic field in the vicinity of the magnet. The sensor may include a magnetic sensor operable to sense magnetic changes as the features pass.

The features may be teeth formed around the rotatable member. The passage of features may create first type pulses. Features may be provided at regular intervals around the ring, there being at least one position around the ring at which the regularity is disturbed, to form an irregularity which creates second type pulses. A feature may be omitted from a regular position, to create the irregularity. Alternatively, a feature may be irregularly large to create the irregularity.

If the features are teeth, the irregularity may be formed by omitting a tooth or by creating a tooth of abnormal size.

The sensor may include a magnet and a Hall effect sensor, both in proximity with the rotatable member to sense changes in magnetic field as the features pass the sensor.

Embodiments of the invention may incorporate any feature or combination of features of any of the aspects set out above, or of a combination of the aspects.

Embodiments of the present invention will now be described in more detail, by way of example only, and with reference to the accompanying drawings, in which.

Figure 3:
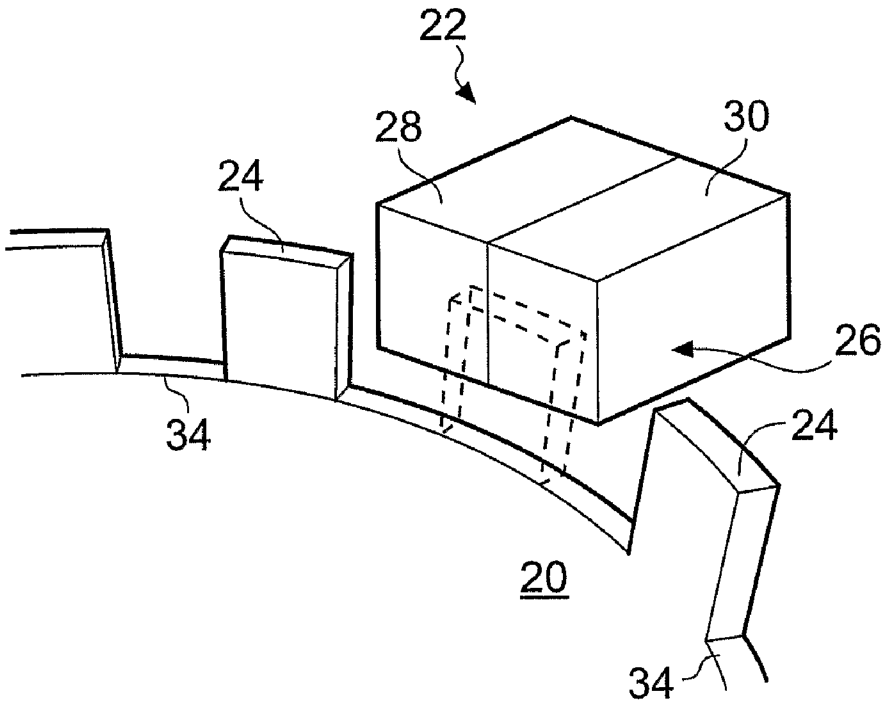
FIG. 3 is a partial perspective view, on an enlarged scale, of principal components of a sensor arrangement for one example of a monitoring arrangement of the present invention.
Figure 4:
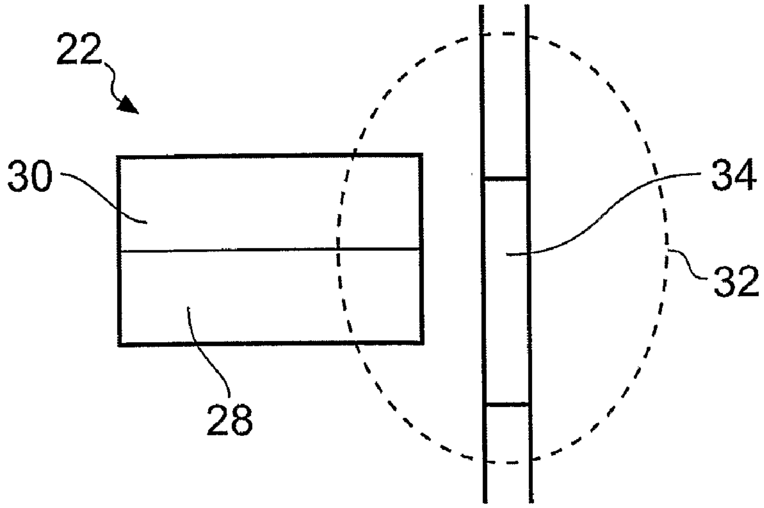
Figure 5:
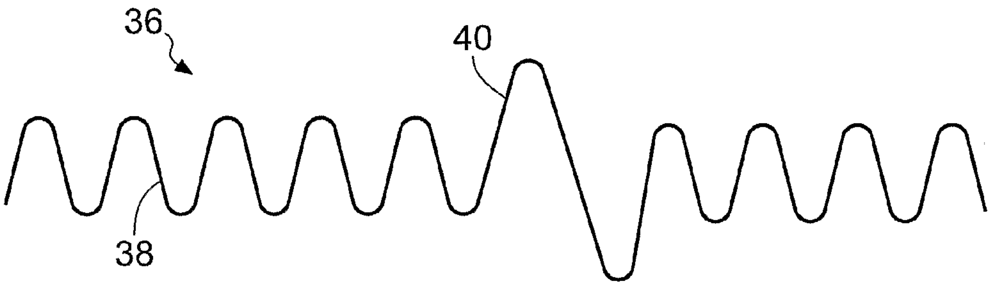
Figure 6:
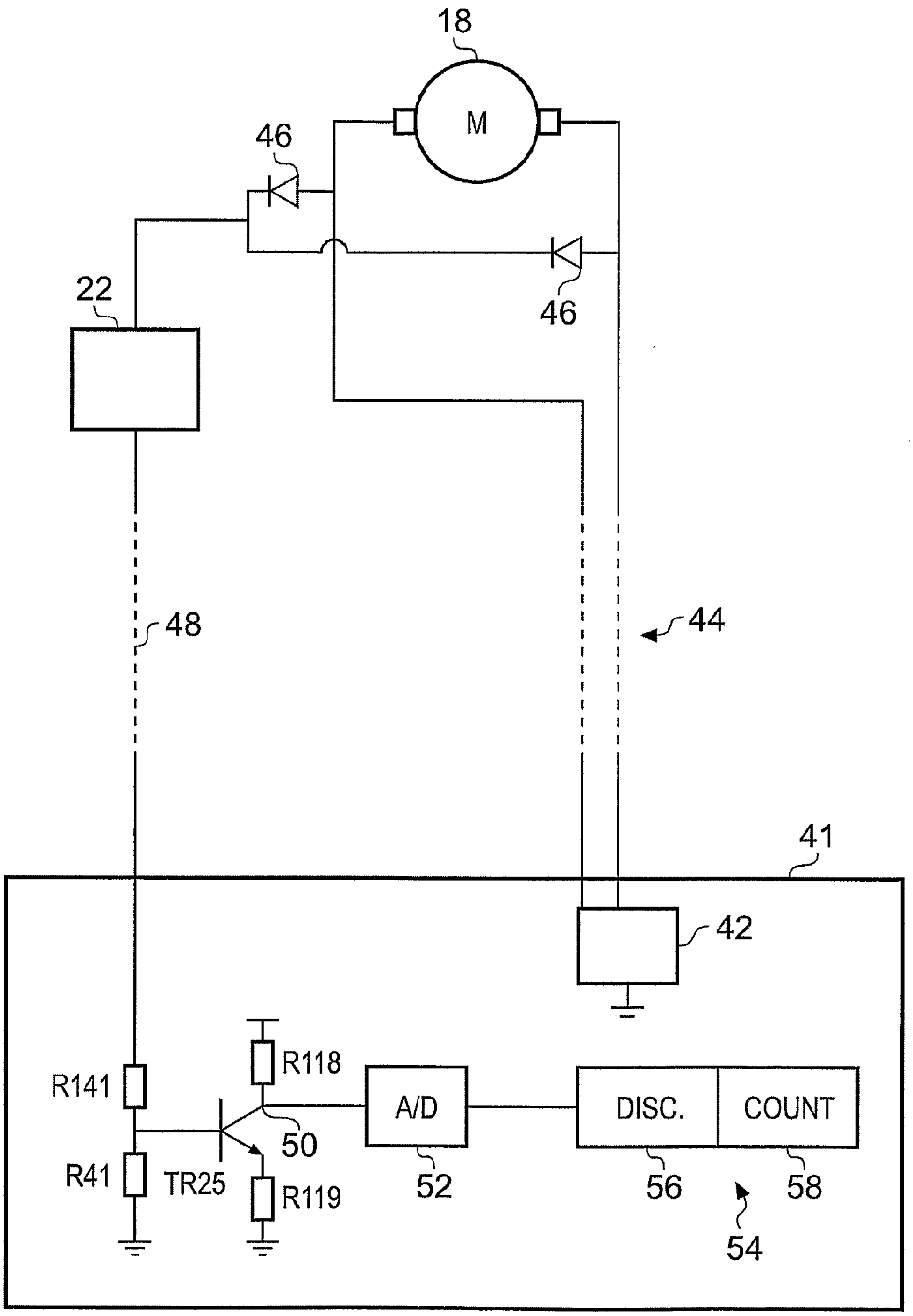

FIG. 4 schematically illustrates the magnetic effects within the sensor of FIG. 3;

FIG. 5 indicates the output waveform of the sensor of FIG. 3;

FIG. 6 illustrates in simplified form the manner in which signals are passed to a control circuit; and FIG. 7 illustrates the arrangements of FIG. 6, in more detail.

Figure 1:
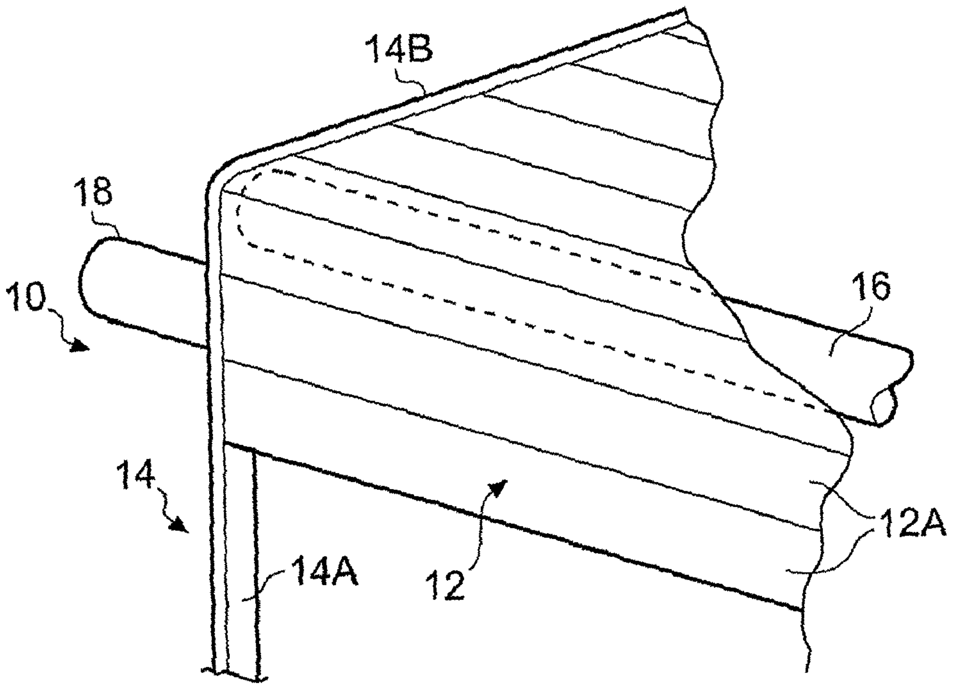
FIG. 1 is a highly schematic, part cut-away perspective view of an example of an aperture closure arrangement with which the present invention may be used.

FIG. 1 illustrates an aperture closure member arrangement 10. A closure member 12, in the form of a door, is guided along a track 14. The door 12 is shown as articulated slats 12A but may alternatively be flexible reinforced fabric or sheet metal, for example, as noted above.

Figure 2:
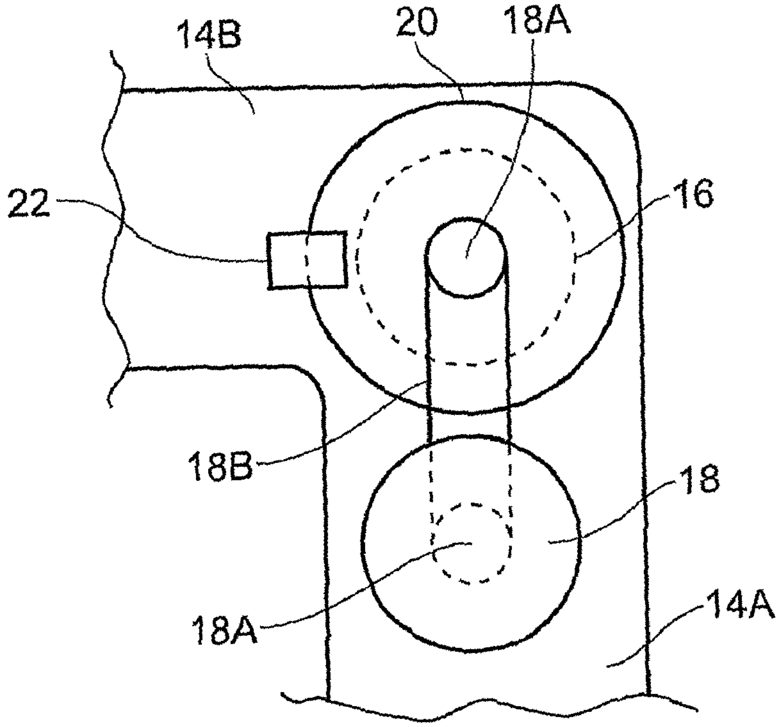
FIG. 2 is a simplified elevation view of part of the arrangement.

The track 14 has a generally vertical leg 14A. As the door 12 moves up the vertical track 14A, it may either pass onto a generally horizontal leg 14B, or be rolled (not shown). The door 12 is moved by a shaft 16 which is in turn driven by a DC electric motor 18 through two pulley wheels 18A connected by a drive belt 18B, as shown schematically in FIG. 2.

A similar track (not shown) is provided at the other side of the door 12. The tracks are installed with the vertical legs extending up either side of the aperture to be closed (such as an aperture in the outer wall of a building). The horizontal legs of the tracks extend back from the aperture, into the building. When the door is closed, it forms a vertical barrier between the vertical legs of the tracks. To open the door, the motor 18 is used to turn the shaft 16, moving the door up to the horizontal legs of the tracks, or rolling the door around the axis of the shaft 16.

In the examples being described, the motor has a fast speed and a slow speed, the latter being used when the door is approaching the ends of its range of movement.

The shaft 16 carries a rotatable member in the form of a disc 20 (FIG. 2) which rotates as the shaft 16 rotates. Consequently, the disc 20 rotates as the door 12 moves. A sensor 22 is provided to detect rotation of the disc 20, and thus to detect movement of the door 12.

The disc 20 (FIG. 3) has a ring of features 24, which are teeth in this example. The sensor 22 is able to sense the teeth 24, as they pass. In this example, the features 24 are a ring of circumferential teeth around the disc 20, being spaced regularly around the disc 20, but including an irregularity 26 at least one position around the disc 20. The irregularity 26 is provided, in this example, by a tooth missing from the otherwise regular ring of teeth 24, to create an irregularly large gap between adjacent teeth. The location of the missing tooth is indicated in FIG. 3 by broken lines. In an alternative, a tooth of abnormal size may be created, for example by joining two adjacent teeth 24. The abnormal size tooth forms an irregularity in an otherwise regular line of teeth.

The passing of the teeth 24 creates first type pulses from the sensor 22, as will be described. The passing of the irregularity 26 creates a second type pulse from the sensor 22, as will be described.

The sensor 22 includes a Hall effect sensor 28 and an associated magnet 30, for example a permanent magnet. The sensor 28 and magnet 30 are placed in close proximity to the ring of teeth 24, so that the teeth 24 pass through a region 32 (FIG. 4) in which a magnetic field exists, created by the magnet 30 and affecting the sensor 28.

As the teeth 24 pass the sensor 28, the magnetic field in the region 32 is affected. For example, the amount of magnetic material provided by the teeth 24, within the region 32, reduces on each occasion that a gap 34 between adjacent teeth 24 passes through the region 32. A much greater deviation arises when the irregularity 26 passes through the region 32, because of the missing tooth.

The waveform 36 from the sensor 28 is illustrated schematically in FIG. 5. The waveform 36 consists primarily of cyclic pulses 38 of relatively small amplitude, created by the passing of the teeth 24 and the gaps between them, and consequently of regular frequency and amplitude. The frequency of the small pulses 38 is linked to the speed of rotation of the disc 20. Specifically, a complete cycle of a small pulse 38 occurs as each tooth 24 passes the sensor 28. Less frequently, a second type pulse 40 arises. This is greater in amplitude and lower in frequency than the pulses 38, as can be seen from FIG. 5. The large pulse 40 is created by the passing of the irregularity 26, i.e. the missing tooth 26A. The greater amplitude arises because the wider gap at the irregularity 26 results in a greater disturbance of the magnetic field in the region 32. The lower frequency arises from the greater distance between the neighbouring teeth 24.

FIG. 6 illustrates how the sensor 28 is powered, and how the output waveform 36 (illustrated in FIG. 5) is used. FIG. 6 shows a control circuit 41 which includes a power supply 42 connected at 44 to the motor 18. The power supply 42 enables the motor 18 to be switched on or off and to be driven in either direction by reversing the polarity of the connections 44. This results in the door 12 being moved to open or close.

The sensor arrangements 22, including the disc 20, sensor 28 and magnet 30 are illustrated in FIG. 6 in the vicinity of the motor 18. Power to the arrangement 22, particularly to the sensor 28, is drawn from the connections 44, at the motor 18, through rectifier diodes 46, to take account of the polarity changes which arise on the connections 44 as the motor is reversed.

The arrangement 22 acts as a current supply to return a signal current at a connection 48, back to the control circuit 41. The arrangement 22 modulates the signal current at 48, as will be described, in accordance with movement of the disc 20 and thus, in accordance with movement of the door 12. This allows the movement of the door 12 to be sensed by the control circuit 41, for reasons which will become apparent.

The modulated current sent at 48 has the waveform 36. The current received at 48 by the circuit 41 is applied to a potential divider R141, R41 to provide voltage to the base of a transistor TR25, connected as a common emitter amplifier creating an amplified voltage waveform at the collector 50, having the waveform 36 derived from the signal current sent from the arrangement 22.

The amplified waveform at 50 is applied to an analogue to digital converter 52, and then to a discriminator-and-count circuit 54. The circuits 52, 54 may either or both be implemented as appropriately programmed software-controlled processor devices.

The discriminator 56 of the circuit 54 is able to discriminate between small pulses 38 and large pulses 40, by monitoring peak-to-peak amplitude and pulse width. Consequently, the discriminator 56 may either reject small pulses 38, passing only large pulses 40 to the counter 58 of the circuit 54, for counting, or alternatively, may reject large pulses 40, passing only small pulses 38 to the counter 58, for counting.

The discrimination implemented by the discriminator 56 is dependent on the count value at the time. In one example, large pulses 40 are initially counted when the door 12 begins to move, e.g. from the fully open position toward the closed position. Since an irregularity 26 passes the sensor 28 less frequently than teeth 24, this results in a slow count representing a coarse monitoring of the position of the door 12. In this example, the coarse count is maintained until indicating that the door is approaching one end of its range of movement. For example, movement of the door 12 from the fully open position to the fully closed position may be known to generate four large pulses 40, but that the fully closed position is reached before a fifth large pulse 40 can be created. Accordingly, in this example, the discriminator 56 is initially used to reject small pulses 38, so that the counter 58 counts large pulses until four such pulses have been counted. The discriminator 56 then begins rejecting large pulses 40 and passing small pulses 38 to the counter 58. Small pulses are created by the passing of the teeth 24 and are therefore higher in frequency than the large pulses 40. They correspond with a fine measurement of the door position. Accordingly, fine measurement is used only at an end region of the door travel, close to the end position. This allows the door 12 to be stopped more accurately at the desired final position, than would be possible if only large pulses 40 were counted.

In a preferred example, the counter 58 is a zero-crossing counter, so that the count can be changed twice for each cycle of the waveform 36. This doubles the resolution provided for the measured position of the door 12.

It can be seen from FIG. 6 that only three connections 44, 48 are required, from the control circuit 41 to the motor 18 and sensor arrangement 22. This arises because the arrangement 22 is powered from one polarity of the motor 18 locally, at the motor, being connected to the other polarity of the motor within the circuit 41. Thus, when the control circuit 41 is located remotely of the motor 18, which allows manual access to the control circuit without proximity to the motor 18, only three wires are required to run between the two locations, thus simplifying and reducing the cost of installation.

Figure 7A:
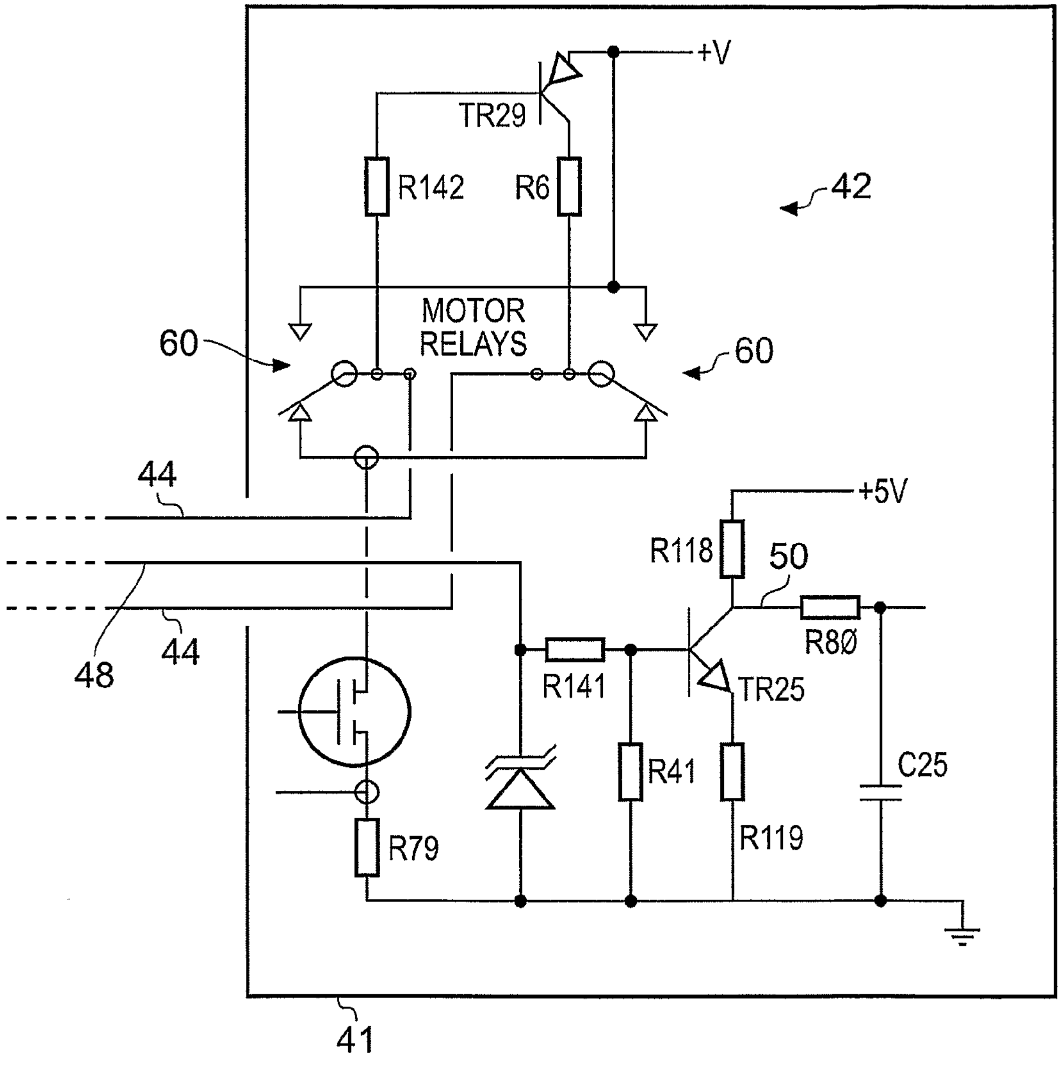
Figure 7B:
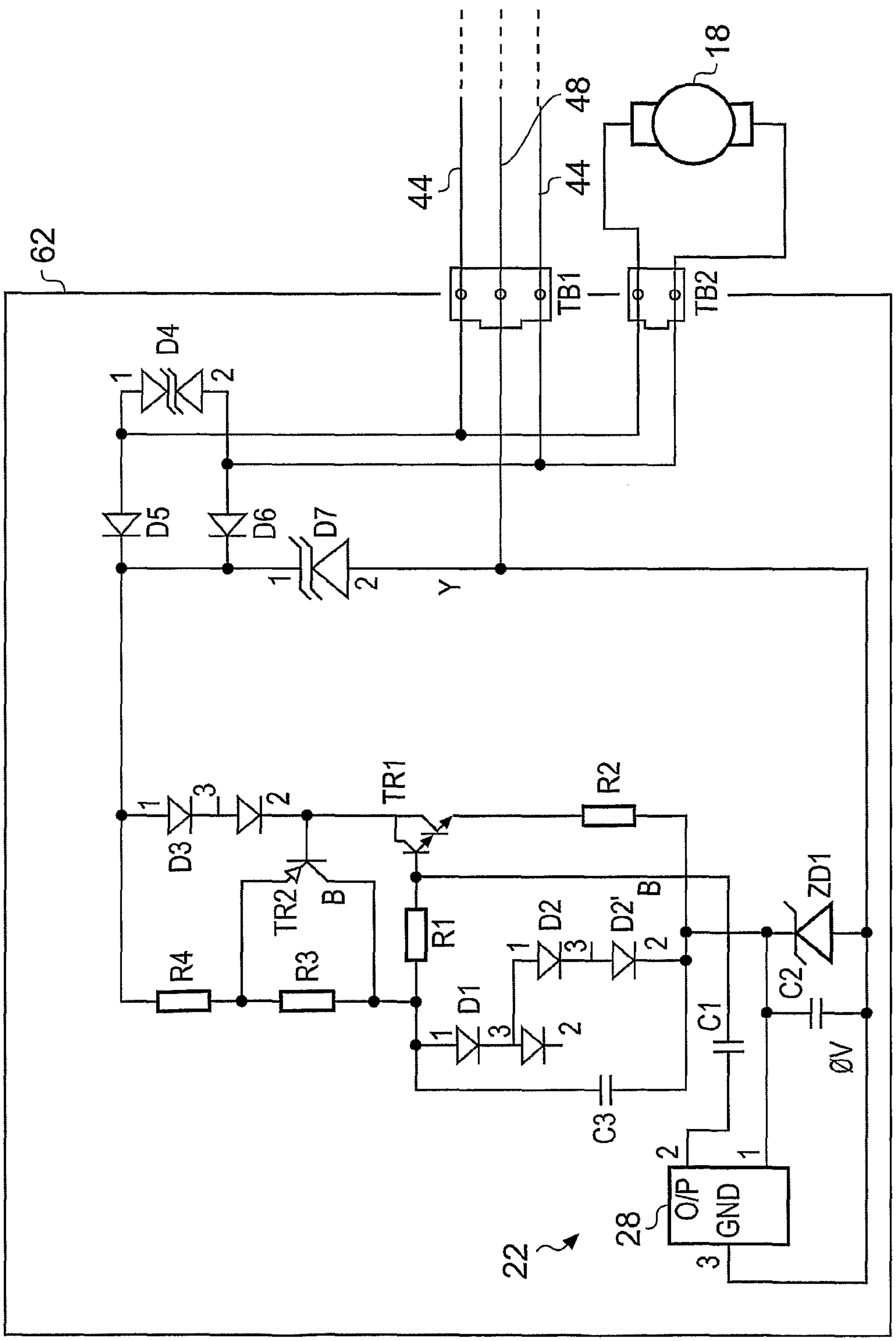

The circuits of the sensor arrangement 22 and the control circuit 41 can be seen in more detail in FIGS. 7A and 7B.

FIG. 7A shows the control circuit 41, including the power supply 42. The supply 42 is DC and can be applied to the connections 44 in either polarity, according to the settings of two relays 60. In FIG. 7A, the relays are shown shorting together the connections 44, thus braking the motor 18. If either relay 60 changes state, the supply 42 is connected to the motor with corresponding polarity. Consequently, setting the relays 60 allows the motor to be switched off, or switched on to turn in either direction.

FIG. 7B shows a further circuit 62 which connects the connections 44 through to the motor 18, and also provides the circuitry of the sensor arrangement 22. Power to the arrangement 22 is drawn from the connections 44 through rectifier diodes D5, D6 (corresponding with the diodes 46 of FIG. 6). This power is applied to a Darlington pair transistor TR1 connected as a current source providing output current through an emitter resistor R2 and a voltage regulator diode ZD1 to the connection 48. Specifically, the three P-N junctions of diodes D1, D2, D2' are across the base-emitter junctions of the Darlington pair TR1 thus maintaining the Darlington pair TR1 as a current source, the current value being set primarily by R2.

The current output of the Darlington pair TR1 is modulated by a base voltage at 64. This voltage is the output voltage of the Hall effect sensor 28. Accordingly, the output current of the Darlington pair TR1, applied to the connection 48, is modulated by the waveform 36 of FIG. 5. This modulated signal current is sent back to the control circuit 41, over the connection 48.

Returning to FIG. 7A, the signal current from the Darlington pair TR1 is received on the connection 48 and applied through the voltage divider R141, R41 to the base of transistor TR25, acting as a common emitter amplifier, as has been described. The amplified output voltage appears at 50 for applying to the A to D converter 52 and discriminate-and-count circuit 54 (neither of which are illustrated in FIG. 7A, for simplicity).

Many modifications can be made to the apparatus described above, without departing from the scope of the invention. For example, teeth which are detected magnetically could alternatively be detected optically or mechanically. Alternatively, other types of feature could be detected magnetically, optically or mechanically, including alternatives which can be detected by one of these means, but not others, such as variations of the magnetic properties of a mechanically uniform disc.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An aperture closure member control arrangement, comprising:

a pulse generator operable to create a train of pulses as the aperture closure member moves;

a counter operable to count pulses of the train to provide an indication of the position of the aperture closure member;

wherein the pulse generator creates first type pulses and less frequent second type pulses, and wherein the arrangement further includes a discriminator operable to discriminate between first and second type pulses, for providing a count based selectively on first or second type pulses;

wherein the selection of pulses made by the discriminator for provision to the counter is dependent on the count value at the time; and wherein the second type of pulse is counted until a threshold count is reached, the first type of pulse being counted thereafter.

2. An arrangement according to claim 1, wherein the discriminator monitors the size, amplitude and/or pulse width of pulses received, the first and second type pulses being distinguishable by the monitored parameter or parameters.

3. An arrangement according to claim 1, wherein the pulses are created by a member which rotates as the aperture closure member moves.

4. An arrangement according to claim 3, wherein the rotatable member has a ring of features, there being a sensor operable to sense the passing of the features as the member rotates, to create pulses for counting.

5. An arrangement according to claim 4, wherein the passage of features creates first type pulses.

6. An arrangement according to claim 4, wherein features are provided at regular intervals around the ring, there being at least one position around the ring at which the regularity is disturbed, to form an irregularity which creates second type pulses.

7. An aperture closure member according to claim 1, wherein the counter is operable to provide an indication of the position of the aperture closure member relative to the fully open position of the aperture closure member.

8. An aperture closure member control arrangement comprising:

a rotatable member which rotates as the aperture closure member moves;

a sensor;

a ring of features on the rotatable member and able to be sensed by passing the sensor to create a train of first type pulses;

wherein the ring of features includes an irregularity at least one position, to create a second type pulse within the train;

wherein the arrangement further includes a discriminator operable to discriminate between first and second type pulses, for providing a count based selectively on first or second type pulses; and wherein the second type of pulse is counted until a threshold count is reached, the first type of pulse being counted thereafter.

9. An arrangement according to claim 8, wherein the first and second type pulses are distinguishable by size, amplitude and/or pulse width.

10. An arrangement according to claim 8, wherein the features are discernible optically, magnetically or mechanically.

11. An arrangement according to claim 8, wherein the features are teeth.

12. An arrangement according to claim 8, wherein the features are of a material, there being an associated magnet arranged so that the passing of features creates a detectable change in the magnetic field in the vicinity of the sensor.

13. An arrangement according to claim 8, wherein the features are of a magnetic material so that the passing of features creates a detectable change in the magnetic field in the vicinity of the sensor.

14. An arrangement according to claim 8, wherein the passage of features creates first type pulses.

15. An arrangement according to claim 8, wherein features are provided at regular intervals around the ring, there being at least one position around the ring at which the regularity is disturbed, to form an irregularity which creates second type pulses.

16. An arrangement according to claim 8, wherein the sensor includes a magnet and a Hall effect sensor, both in proximity with the rotatable member to sense changes in magnetic field as the features pass the sensor.

17. An arrangement according to claim 8, wherein the selection of pulses made by the discriminator for provision to the counter is dependent on the count value at the time.

18. An aperture closure member according to claim 8, wherein a counter is operable to count pulses of the train to provide an indication of the position of the aperture closure member relative to the fully open position of the aperture closure member.

19. An aperture closure member control arrangement comprising:

a control circuit operable to provide electrical power to a motor to drive the aperture closure member, when required;

a current supply powered from the motor supply to return a signal current to the control circuit;

and a sensor operable to modulate the signal current in accordance with movement of the aperture closure member, for sensing at the control circuit, the sensor being operable to create first type pulses and less frequent second type pulses; and wherein the arrangement further includes a discriminator operable to discriminate between first and second type pulses, for providing a count based selectively on first or second type pulses; and wherein the second type of pulse is counted until a threshold count is reached, the first type of pulse being counted thereafter.

20. An arrangement according to claim 19, wherein the current supply is powered by a first polarity of the motor supply, the signal current being connected to another polarity of the motor supply, at the control circuit.

21. An arrangement according to claim 19, wherein the signal current is carried by a single conductor from the sensor to the control circuit.

22. An arrangement according to claim 19, wherein the control circuit is located remotely of the motor, for manual access to the control circuit without proximity to the motor.

23. An arrangement according to claim 19, wherein the sensor senses movement of a rotatable member which rotates as the aperture closure member moves.

24. An arrangement according to claim 23, wherein the rotatable member has a ring of features able to be sensed by passing the sensor to create a train of pulses.

25. An arrangement according to claim 24, wherein the ring of features create a train of first type pulses, the ring of features also including an irregularity at least one position, to create a second type pulse within the train.

26. An arrangement according to claim 25, wherein the first and second type pulses are distinguishable by size, amplitude and/or pulse width.

27. An arrangement according to claim 24, wherein the features are discernible optically, magnetically or mechanically.

28. An arrangement according to claim 24, wherein the features are teeth.

29. An arrangement according to claim 24, wherein the features are of a material, there being an associated magnet arranged so that the passing of features creates a detectable change in the magnetic field in the vicinity of the sensor.

30. An arrangement according to claim 29, wherein the features are of a magnetic material so that the passing of features creates a detectable change in the magnetic field in the vicinity of the sensor.

31. An arrangement according to claim 19, wherein the selection of pulses made by the discriminator for provision to the counter is dependent on the count value at the time.

32. An aperture closure member according to claim 19, wherein a counter is operable to count pulses of the train to provide an indication of the position of the aperture closure member relative to the fully open position of the aperture closure member.

33. An arrangement according to claim 24, wherein features are provided at regular intervals around the ring, there being at least one position around the ring at which the regularity is disturbed, to form an irregularity which creates second type pulses.

34. An arrangement according to claim 19, wherein the sensor includes a magnet and a Hall effect sensor, both in proximity with the rotatable member to sense changes in magnetic field as the features pass the sensor.

35. An aperture closure member control arrangement comprising:

a control circuit operable to provide electrical power to a motor to drive the aperture closure member, when required;

a current supply powered from the motor supply to return a signal current to the control circuit;

and a sensor operable to modulate the signal current in accordance with movement of the aperture closure member, for sensing at the control circuit;

wherein the current supply is powered by a first polarity of the motor supply, the signal current being connected to another polarity of the motor supply, at the control circuit.

36. An arrangement according to claim 35, wherein the signal current is carried by a single conductor from the sensor to the control circuit.

37. An arrangement according to claim 35, wherein the control circuit is located remotely of the motor, for manual access to the control circuit without proximity to the motor.

38. An arrangement according to claim 35, wherein the sensor senses movement of a rotatable member which rotates as the aperture closure member moves.

39. An arrangement according to claim 38, wherein the rotatable member has a ring of features able to be sensed by passing the sensor to create a train of pulses.

40. An arrangement according to claim 39, wherein the ring of features create a train of first type pulses, the ring of features also including an irregularity at least one position, to create a second type pulse within the train.

41. An arrangement according to claim 40, wherein the first and second type pulses are distinguishable by size, amplitude and/or pulse width.

42. An arrangement according to claim 39, wherein the features are discernible optically, magnetically or mechanically.

43. An arrangement according to claim 39, wherein the features are teeth.

44. An arrangement according to claim 39, wherein the features are of a material, there being an associated magnet arranged so that the passing of features creates a detectable change in the magnetic field in the vicinity of the sensor.

45. An arrangement according to claim 44, wherein the features are of a magnetic material so that the passing of features creates a detectable change in the magnetic field in the vicinity of the sensor.

46. An arrangement according to claim 35, wherein the arrangement further includes a discriminator operable to discriminate between first and second type pulses, for providing a count based selectively on first or second type pulses.

47. An arrangement according to claim 46, wherein the selection of pulses made by the discriminator for provision to the counter is dependent on the count value at the time.

48. An arrangement according to claim 46, wherein one type of pulse is counted until a threshold count is reached, the other type of pulse being counted thereafter.

49. An arrangement according to claim 48, wherein the second type pulses is counted until the threshold is reached.

50. An aperture closure member according to claim 35, wherein a counter is operable to count pulses of the train to provide an indication of the position of the aperture closure member relative to the fully open position of the aperture closure member.

51. An arrangement according to claim 39, wherein features are provided at regular intervals around the ring, there being at least one position around the ring at which the regularity is disturbed, to form an irregularity which creates second type pulses.

52. An arrangement according to claim 35, wherein the sensor includes a magnet and a Hall effect sensor, both in proximity with the rotatable member to sense changes in magnetic field as the features pass the sensor.

* * * * *

UNITED STATES PATENT AND TRADEMARK OFFICE

CERTIFICATE OF CORRECTION

PATENT NO. : 8,115,438 B2
APPLICATION NO. : 12/299660
DATED : February 14, 2012
INVENTOR(S) : Bruce Stanley Gunton It is certified that error appears in the above-identified patent and that said Letters Patent is hereby corrected as shown below:

Col. 7, claim 8, line 9, “irregularity at least” should read --irregularity at at least--.

Col. 8, claim 25, line 3, “irregularity at least” should read --irregularity at at least--.

Col. 9, claim 40, line 3, “irregularity at least” should read --irregularity at at least--.

Signed and Sealed this
First Day of May, 2012

David J. Kappos
*Director of the United States Patent and Trademark Office*

UNITED STATES PATENT AND TRADEMARK OFFICE

CERTIFICATE OF CORRECTION

PATENT NO. : 8,115,438 B2
APPLICATION NO. : 12/299660
DATED : February 14, 2012
INVENTOR(S) : Bruce Stanley Gunton It is certified that error appears in the above-identified patent and that said Letters Patent is hereby corrected as shown below:

Column 7, line 31 (claim 8, line 9) “irregularity at least” should read --irregularity at at least--.

Column 8, line 48 (claim 25, line 3) “irregularity at least” should read --irregularity at at least--.

Column 9, line 43 (claim 40, line 3) “irregularity at least” should read --irregularity at at least--.

This certificate supersedes the Certificate of Correction issued May 1, 2012.

Signed and Sealed this
Twenty-ninth Day of May, 2012

David J. Kappos
*Director of the United States Patent and Trademark Office*